US011787122B2

(12) United States Patent
Ito et al.

(10) Patent No.: US 11,787,122 B2
(45) Date of Patent: Oct. 17, 2023

(54) DROPLET DISCHARGE APPARATUS, DROPLET DISCHARGE METHOD, AND NON-TRANSITORY STORAGE MEDIUM

(71) Applicants: Yoichi Ito, Tokyo (JP); Tsuyoshi Arao, Kanagawa (JP); Yoichi Sakurai, Kanagawa (JP); Tomomi Akieda, Kanagawa (JP)

(72) Inventors: Yoichi Ito, Tokyo (JP); Tsuyoshi Arao, Kanagawa (JP); Yoichi Sakurai, Kanagawa (JP); Tomomi Akieda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 12 days.

(21) Appl. No.: 17/215,188

(22) Filed: Mar. 29, 2021

(65) Prior Publication Data

US 2021/0299966 A1 Sep. 30, 2021

(30) Foreign Application Priority Data

Mar. 31, 2020 (JP) .................................. 2020-064434
Jul. 16, 2020 (JP) .................................. 2020-122420

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B33Y 10/00* (2014.12); *B33Y 50/02* (2014.12)

(58) Field of Classification Search
CPC ... B29C 64/393; B29C 64/209; B29C 64/165; B29C 64/35; B29C 64/112;
(Continued)

(56) References Cited

U.S. PATENT DOCUMENTS

2005/0030332 A1\* 2/2005 Masuda ................. B41J 29/393
347/19
2010/0066779 A1 3/2010 Gothait et al.
(Continued)

FOREIGN PATENT DOCUMENTS

CN 101905205 A 12/2010
CN 105415673 A 3/2016
(Continued)

OTHER PUBLICATIONS

CA Extended European Search Report dated Aug. 10, 2021.
Chinese Office Action dated Sep. 2, 2022 for corresponding Chinese patent application No. CN202110339030.5.

*Primary Examiner* — Joseph S Del Sole
*Assistant Examiner* — Mohamed K Ahmed Ali
(74) *Attorney, Agent, or Firm* — Harness, Dickey & Pierce, P.L.C.

(57) ABSTRACT

A droplet discharge apparatus includes a discharge head including a nozzle, a nozzle surface observation device, and processing circuitry. The discharge head including the nozzle is configured to discharge a droplet onto a discharge receiving medium formed of powder. The nozzle surface observation device is configured to observe a nozzle surface of the nozzle of the discharge head. The processing circuitry is configured to calculate an adhesion amount of attached matter to the nozzle surface based on an observation result of the nozzle surface observation device. The processing circuitry is configured to determine, based on a calculation result of the adhesion amount of the attached matter, an operation on a control target that controls at least one of a mass and a discharge speed of the droplet.

13 Claims, 6 Drawing Sheets

(51) Int. Cl.
  *B33Y 10/00* (2015.01)
  *B33Y 50/02* (2015.01)
(58) Field of Classification Search
  CPC .................. B29C 64/153; B29C 64/386; B41J
    2002/16573; B41J 2/16517; B41J 2/16579
  See application file for complete search history.

(56) References Cited

U.S. PATENT DOCUMENTS

| | | |
|---|---|---|
| 2010/0310757 A1 | 12/2010 | Ooshiro et al. |
| 2015/0259784 A1 | 9/2015 | Goto et al. |
| 2016/0075085 A1 | 3/2016 | Sasaki |
| 2017/0021631 A1 | 1/2017 | Ono |
| 2017/0113411 A1 | 4/2017 | Watanabe et al. |
| 2017/0258556 A1 | 9/2017 | Watanabe et al. |
| 2017/0326645 A1 | 11/2017 | Saito et al. |
| 2019/0210282 A1 | 7/2019 | Sugiura et al. |
| 2019/0255765 A1 | 8/2019 | Takeyama et al. |
| 2019/0255766 A1 | 8/2019 | Takeyama et al. |
| 2019/0286104 A1 | 9/2019 | Sugawara et al. |
| 2020/0164574 A1 | 5/2020 | Tsuji et al. |
| 2020/0230887 A1 | 7/2020 | Arao et al. |
| 2020/0262153 A1 | 8/2020 | Arao et al. |
| 2020/0298509 A1 | 9/2020 | Takai et al. |
| 2020/0361149 A1 | 11/2020 | Arao et al. |

FOREIGN PATENT DOCUMENTS

| | | |
|---|---|---|
| JP | 63-260449 | 10/1988 |
| JP | 2-198847 | 8/1990 |
| JP | 7-304183 | 11/1995 |
| JP | 10-268127 | 10/1998 |
| JP | 11-179934 | 7/1999 |
| JP | 2004-066810 | 3/2004 |
| JP | 2005-161838 | 6/2005 |
| JP | 2007-229928 A | 9/2007 |
| JP | 2008-012880 | 1/2008 |
| JP | 2008-132786 | 6/2008 |
| JP | 2008-173600 | 7/2008 |
| JP | 2013-078858 A | 5/2013 |
| JP | 2015-131419 | 7/2015 |
| JP | 2019-084814 | 6/2019 |

\* cited by examiner

DROPLET DISCHARGE APPARATUS, DROPLET DISCHARGE METHOD, AND NON-TRANSITORY STORAGE MEDIUM

CROSS-REFERENCE TO RELATED APPLICATIONS

This patent application is based on and claims priority pursuant to 35 U.S.C. § 119(a) to Japanese Patent Application No. 2020-064434, filed on Mar. 31, 2020, and 2020-122420, filed on Jul. 16, 2020, in the Japan Patent Office, the entire disclosure of which is hereby incorporated by reference herein.

BACKGROUND

Technical Field

Embodiments of the present disclosure relate to a droplet discharge apparatus, a droplet discharge method, and a storage medium storing program code.

Description of the Related Art

There is known a three-dimensional fabricating apparatus that forms a three-dimensional object by an additive manufacturing method (additive manufacturing). The additive manufacturing method forms a three-dimensional object by repeating a process in which droplets are discharged onto a discharge receiving medium (fabrication powder) accurately disposed on a discharged surface of droplets, powder is further laminated on a discharged surface the droplets, and furthermore droplets are discharged on the powder and solidified.

In such a three-dimensional fabricating apparatus, preferably, the discharge speed of the droplets is set to be equal to or higher than a certain speed and the distance between the discharge surface from which the droplets are discharged and the powder is set to be equal to or smaller than a certain distance to cause the droplets to accurately land on the fabrication powder. In addition, preferably, the size of droplet is also set to be a certain size or more to improve the productivity (production speed) of a three-dimensional object. Furthermore, preferably the size (particle diameter) of the powder is set to be equal to or less than a certain value to increase the resolution (surface property or accuracy) of a three-dimensional object.

SUMMARY

In an aspect of the present disclosure, a droplet discharge apparatus includes a discharge head including a nozzle, a nozzle surface observation device, and processing circuitry. The discharge head including the nozzle is configured to discharge a droplet onto a discharge receiving medium formed of powder. The nozzle surface observation device is configured to observe a nozzle surface of the nozzle of the discharge head. The processing circuitry is configured to calculate an adhesion amount of attached matter to the nozzle surface based on an observation result of the nozzle surface observation device. The processing circuitry is configured to determine based on a calculation result of the adhesion amount of the attached matter, an operation on a control target that controls at least one of a mass and a discharge speed of the droplet.

In another aspect of the present disclosure, a droplet discharge method includes observing, calculating, and determining. The observing observes a nozzle surface of a nozzle of a discharge head by a nozzle surface observation device. The discharge head is configured to discharge a droplet onto a discharge receiving medium formed of powder through the nozzle. The calculating calculates an adhesion amount of attached matter on the nozzle surface based on an observation result of the nozzle surface observation device. The determining determines an operation on a control target that controls at least one of a mass and a discharge speed of the droplet, based on a calculation result of the adhesion amount by the calculating.

In still another aspect of the present disclosure, there is provided a non-transitory, computer-readable storage medium storing computer-readable program code that causes a computer to perform fabrication. The fabrication includes observing, calculating, and determining. The observing observes a nozzle surface of a nozzle of a discharge head configured to discharge a droplets onto a discharge receiving medium formed of powder through the nozzle. The calculating calculates an adhesion amount of attached matter to the nozzle surface based on an observation result of the nozzle surface by the observing. The determining determines an operation on a control target that controls at least one of a mass and a discharge speed of the droplet, based on a calculation result of the adhesion amount by the calculating.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
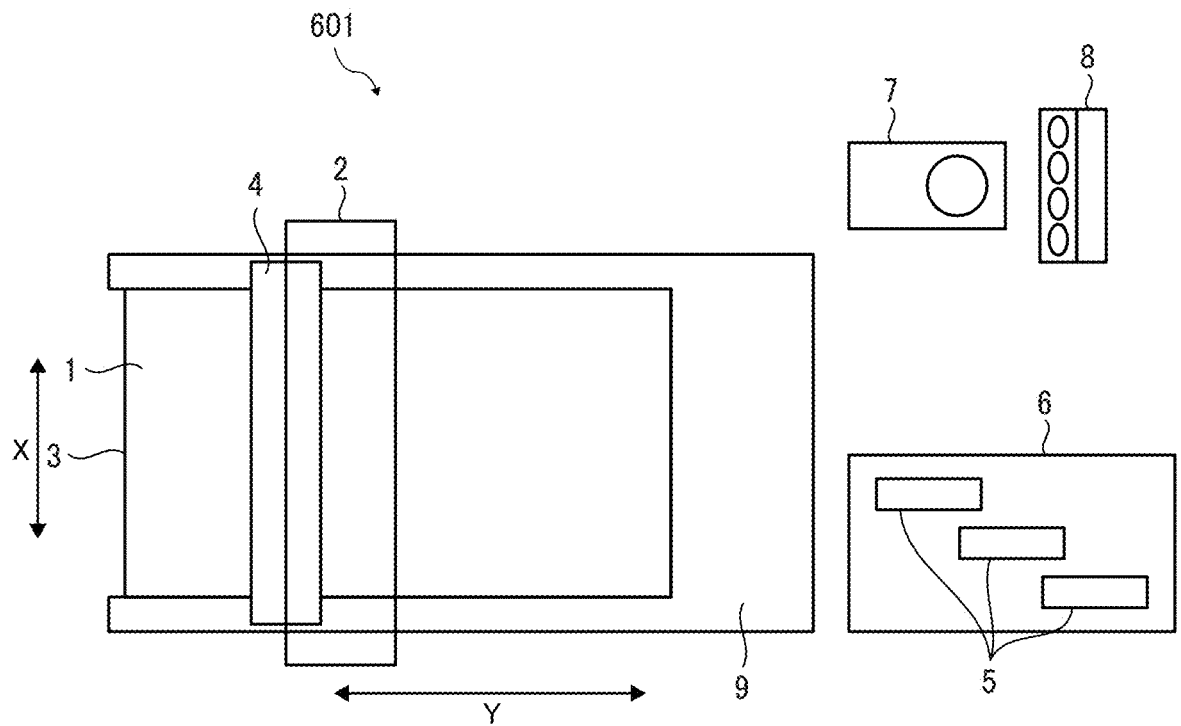
FIG. 1 is a top view of a main part of a three-dimensional fabricating apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a three-dimensional fabricating apparatus according to embodiments of the present disclosure is described with reference to the accompanying drawings.

First Embodiment

External Configuration of Three-Dimensional Fabricating Apparatus

Figure 2:
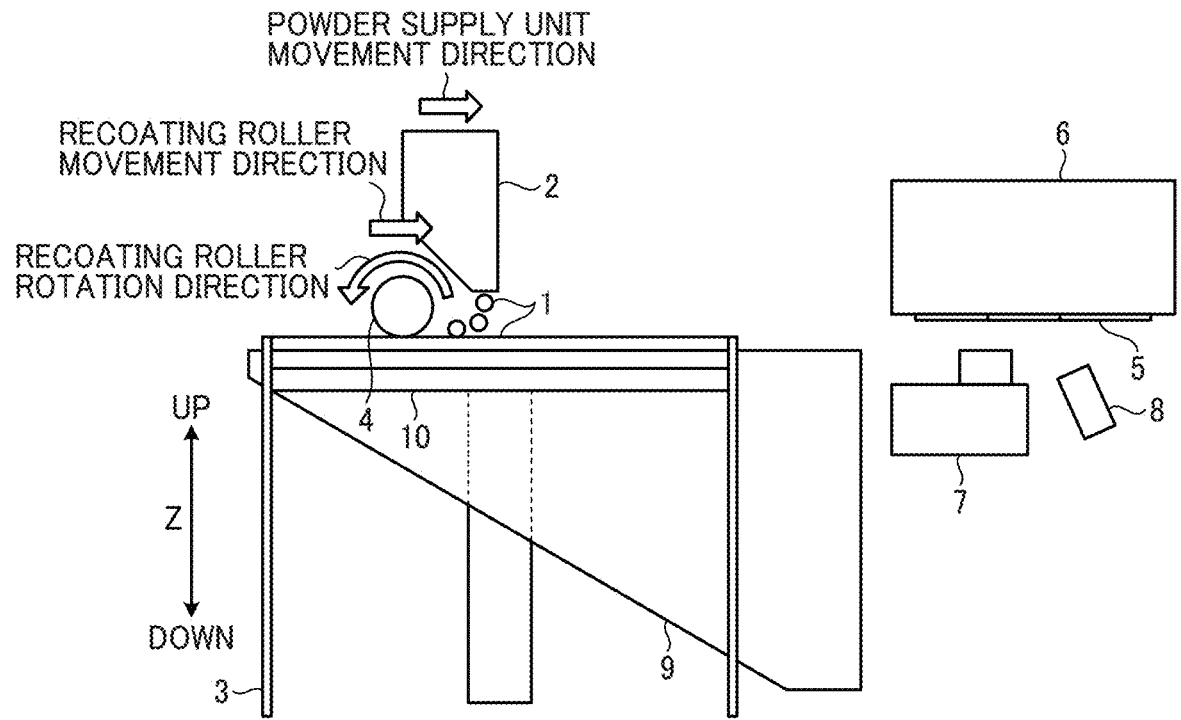
FIG. 2 is a partially-transparent side view of the three-dimensional fabricating apparatus according to the first embodiment of the present disclosure.

First, FIG. 1 is a top view of a three-dimensional fabricating apparatus according to a first embodiment of the present disclosure. FIG. 2 is a partially-transparent side view of the three-dimensional fabricating apparatus according to the first embodiment of the present disclosure. A three-dimensional fabricating apparatus 601 according to the first embodiment repeats a process of laminating powder of resin, metal, ceramic, or the like, discharging droplets by an inkjet method, and solidifying the droplets to form a three-dimensional object.

Note that, as an example, a description is given assuming that droplets are discharged by the inkjet method. However, any method may be used as long as droplets are discharged by a device that discharges the droplets such as a dispenser. Further, the three-dimensional fabricating apparatus that performs three-dimensional fabrication is described below as an example. However, any apparatus including a discharge head that discharges droplets can achieve the effects described below. Furthermore, the effects described below can be obtained even when dirt that can adhere to the nozzle surface of the discharge head is an object other than powder.

In FIGS. 1 and 2, powder 1 is supplied into a fabrication chamber 3 by a powder supply device 2 such as a hopper. A recoating roller 4 rotates and moves on the powder 1 to accurately smooth the surface of the powder 1.

A surplus powder receiving chamber 9 is provided adjacent to the fabrication chamber 3. When the surface of the powder 1 is smoothed, a surplus of the powder 1 transferred by the recoating roller 4 falls into the surplus powder receiving chamber 9. A powder supply device 554 (see FIG. 4) is provided on the powder supply device 2. The surplus powder 1 that has fallen into the surplus powder receiving chamber 9 is returned to the powder supply device 2 by the powder supply device 554.

Figure 4:
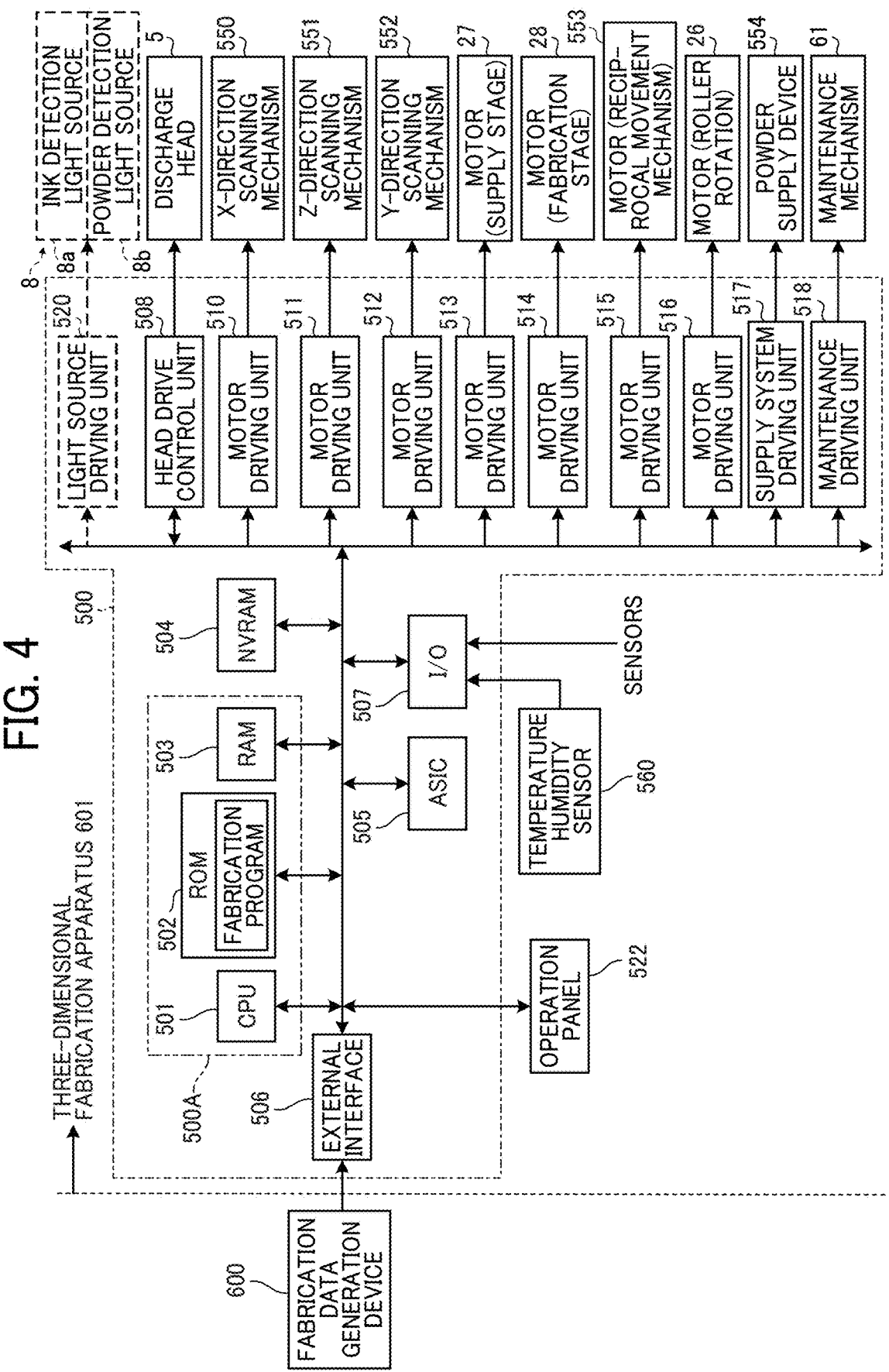
FIG. 4 is a block diagram of a hardware configuration of the three-dimensional fabricating apparatus according to the first embodiment of the present disclosure.

The powder supply device 2 is moved up and down in a vertical direction (height direction) in FIG. 2 by a motor 27 illustrated in FIG. 4. A fabrication stage 10 is moved up and down in the vertical direction in FIG. 2 by a motor 28 in FIG. 4.

Note that the powder supply device 2 may move together with the recoating roller 4, or may move separately from the recoating roller 4. The powder supply device 2 may be fixed (may not move). Further, the powder supply device 2 is not limited to being disposed above the fabrication chamber 3 as illustrated in FIG. 2. For example, a supply chamber may be provided next to the fabrication chamber 3 and the recoating roller 4 may position discharge receiving medium in the supply chamber. Other than employing the recoating roller 4 to smooth the powder 1, for example, a plate-shaped blade may be employed to smooth the powder 1. The three-dimensional fabricating apparatus 601 may be appropriately designed taking consideration of factors such as the size of the entire three-dimensional fabricating apparatus 601, cost, efficiency of operation, accuracy or reliability of positioning the discharge receiving medium, and the like.

In the configuration illustrated in FIG. 1, droplets are discharged from the plurality of discharge heads 5 that are accurately arranged on the carriage 6 to form each layer of the shape of a fabricated object while the carriage 6 moves the powder 1. FIG. 1 illustrates the three-dimensional fabricating apparatus 601 in a state in which the powder 1 is smoothed by the recoating roller 4 while the recoating roller 4 supplies the powder 1. Accordingly, the carriage 6 stands by at a position outside the fabrication chamber 3 at which the carriage 6 does not interfere with the recoating roller 4 and the powder supply device 2.

An optical camera device including a light source 8 is used as a nozzle surface condition detector 7 (an example of a nozzle surface observation device). The nozzle surface condition detector 7 is provided outside the fabrication chamber 3. The nozzle surface condition detector 7 detects droplets or the powder 1 that may act as "dirt" blocking the nozzles of the discharge heads 5. When an optical camera device is used as the nozzle surface condition detector 7, observing the nozzle surfaces of the discharge heads 5 with a certain degree of magnification is necessary. Accordingly, the field of view of the nozzle surface condition detector 7 is narrow, and capturing the conditions of all the nozzle surfaces of the discharge heads 5 at once is difficult. Therefore, the discharge heads 5 scan above the optical camera device (above the nozzle surface condition detector 7) to observe the entire nozzle surfaces of the discharge heads 5 in a plurality of images.

However, images of the discharge heads 5 may be captured by a plurality of optical camera devices without causing the discharge heads 5 to scan to observe the state of all the nozzles of the discharge heads 5 based on the images captured by the plurality of optical camera devices.

Alternatively, instead of using an optical camera device, a device that three-dimensionally captures the shapes of the nozzle surfaces, such as a laser displacement meter, may be used as the nozzle surface condition detector 7. As the light source 8 provided together with the optical camera device, a light source that irradiates light having a wavelength capable of distinguishing between the nozzle surface and the powder 1, or a light source that emits light at a predetermined angle with respect to the nozzle surface may be used.

Alternatively, an observation method of irradiating the nozzle surface with stripe-pattern light having a plurality of widths may be used to three-dimensionally capture the image of the powder 1 attached to the nozzle surface with an optical camera device.

Hardware Configuration

FIG. 4 is a block diagram of a hardware configuration of the three-dimensional fabricating apparatus according to the first embodiment of the present disclosure. In FIG. 4, a controller 500 of the three-dimensional fabricating apparatus 601 according to the first embodiment includes a central processing unit (CPU) 501, a read only memory (ROM) 502, a random access memory (RAM) 503, and a non-volatile random access memory (NVRAM) 504.

The CPU 501 controls the entire three-dimensional fabricating apparatus 601. The ROM 502 stores not only various programs such as a fabrication program for causing the CPU 501 to execute three-dimensional fabrication control but also fixed data and the like. The ROM 502 stores a fabrication program for realizing an observation operation (operation of the flowchart of FIG. 6) of the nozzle surfaces of the discharge heads 5 described later.

The RAM 503 temporarily stores fabrication data and the like. The NVRAM 504 is anon-volatile memory that retains data while the device is powered off. The CPU 501, the ROM 502, and the RAM 503 mainly form a main controller 500A.

The controller 500 includes an application specific integrated circuit (ASIC) 505 that processes input and output signals for controlling the entire three-dimensional fabrication apparatus 601 in addition to various signal processing performed on image data. The controller 500 includes an external interface (external 1/F) 506 for transmitting and receiving fabrication data and the like to and from a fabrication data generation apparatus 600, which is an external device.

The fabrication data generation apparatus 600 is an apparatus that generates fabrication data obtained by slicing a fabricated object in a final form into fabrication layers, and includes an information processing apparatus such as a personal computer.

Further, the controller 500 includes an input and output unit (I/O) 507 for taking in detection signals of various sensors, and a head drive controller 508 that controls drive of each of the discharge heads 5 of a liquid discharge unit.

The controller 500 includes a motor driver 510 that drives a motor of an X-direction scanning mechanism 550 to move a carriage 6 of the liquid discharge unit in X directions (main scanning directions, see FIG. 1), and a motor driver 512 that drives a motor of a Y-direction scanning mechanism 552 that moves a fabricating unit in Y directions (sub-scanning directions, see FIG. 1).

Further, the controller 500 includes a motor driver 511 that drives a motor of a Z-direction lifting mechanism 551 to move (lift) up and down the carriage 6 of the liquid discharge unit in Z directions. The elevation in the Z directions in FIG. 2 may elevate the entire fabricating unit.

The controller 500 includes a motor driver 513 that drives the motor 27 to move up and down a supply stage 23, and a motor driver 514 that drives the motor 28 to move up and down a fabrication table 24. Further, the controller 500 includes a motor driver 515 that drives a motor 553 of a reciprocal moving mechanism 25 to move a flattening roller 12, and a motor driver 516 that drives a motor 26 to rotationally drive the flattening roller 12.

Furthermore, the controller 500 includes a supply system driver 517 that drives a powder supply device 554 to supply powder 20 to the supply chamber 21, and a maintenance driver 518 that drives a maintenance mechanism 61 of the liquid discharge unit.

An input and output unit (I/O) 507 of the controller 500 is supplied with detection signals indicating temperature and moisture as environmental conditions of the three-dimensional fabricating apparatus 601, that are detected by a temperature and moisture sensor 560. The I/O 507 is also supplied with detection signals of other sensors. An operation panel 522 for inputting and displaying information necessary for the three-dimensional fabricating apparatus 601 is connected to the controller 500.

The fabrication data generation apparatus 600 and the three-dimensional fabricating apparatus 601 constitute a three-dimensional fabrication system.

Functional Configuration

Figure 5:
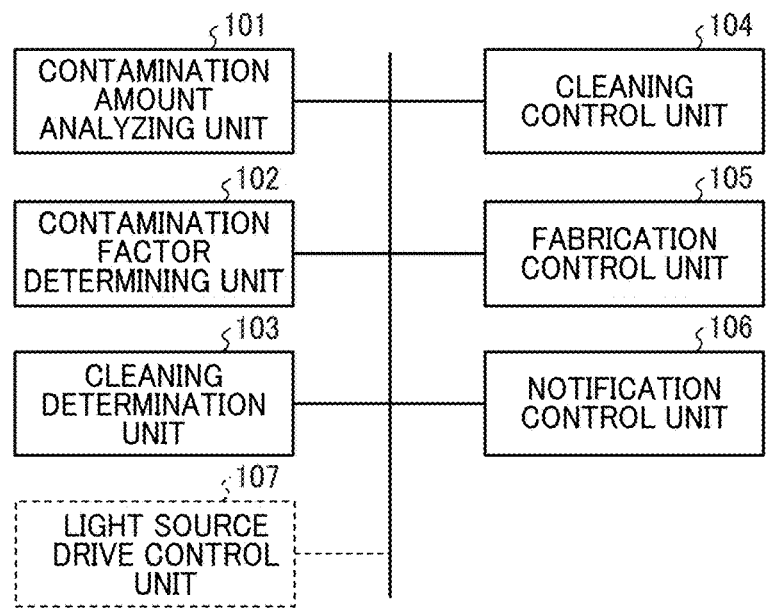
FIG. 5 is a functional block diagram of the three-dimensional fabricating apparatus according to the first embodiment of the present disclosure.

FIG. 5 is a functional block diagram of the three-dimensional fabricating apparatus according to the first embodiment of the present disclosure. The CPU 501 illustrated in FIG. 4 executes a fabrication program stored in a storage unit such as the ROM 502 to implement the functions of the following units illustrated in FIG. 5, a contamination amount analyzing unit 101 (an example of a calculating unit and a nozzle surface contamination amount analyzing unit), a contamination factor determining unit 102, a cleaning determining unit 103 (an example of a nozzle surface cleaning determining unit), a cleaning control unit 104 (an example of a cleaning control unit), a fabrication control unit 105, and a notification control unit 106. The operation of each of the units (the contamination amount analyzing unit 101, the contamination factor determining unit 102, the cleaning determining unit 103, the cleaning control unit 104, the fabrication control unit 105, and the notification control unit 106) will be described later with reference to the flowchart of FIG. 6.

The functions of the contamination amount analyzing unit 101, the contamination factor determining unit 102, the cleaning determining unit 103, the cleaning control unit 104, the fabrication control unit 105, and the notification control unit 106 are implemented by software according to the fabrication program. However, all or some of the functions of the above-described units may be implemented by hardware such as an integrated circuit (IC).

The fabrication program may be stored and provided in a computer-readable recording medium such as a compact disk-read only memory (CD-ROM) or a flexible disk (FD) as file information in an installable format or an executable format. Alternatively, the fabrication program may be stored and provided in a computer-readable storage medium, such as a compact disc recordable (CD-R), a digital versatile or video disk (DVD), a Blu-ray disc ((BD) (registered trademark)), or a semiconductor memory. The fabrication program may be provided so as to be installed via a network such as the Internet. Further, the fabrication program may be incorporated in advance and provided in a ROM or the like in the three-dimensional fabricating apparatus 601.

Conditions Under which Powder can Adhere to Nozzle Surfaces of Discharge Heads

Figure 3:
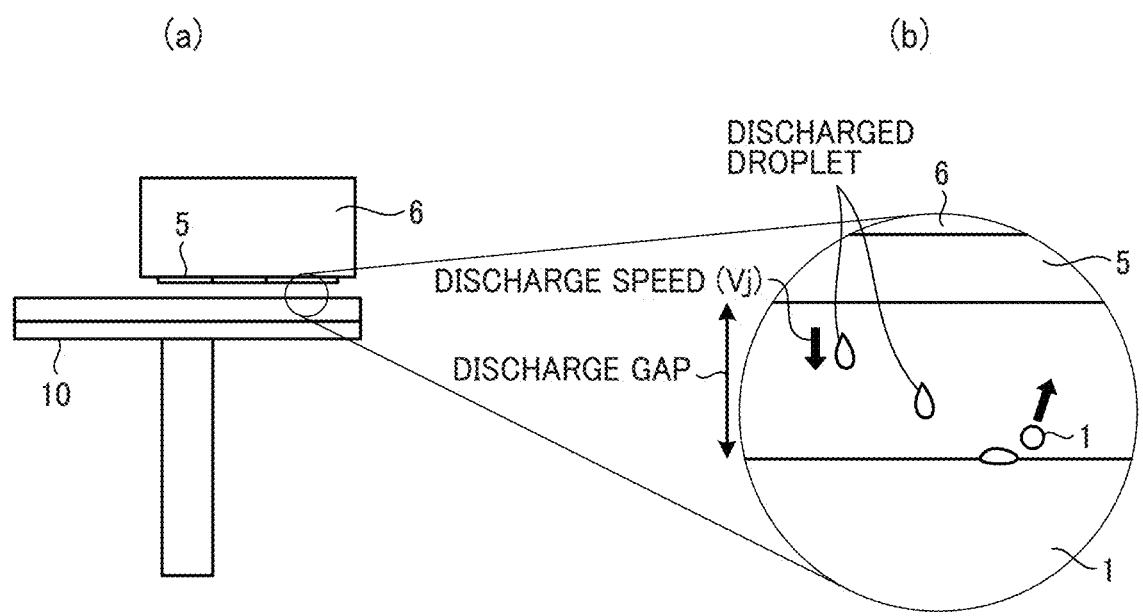
FIG. 3 is a diagram of a discharge head in a state in which the discharge head discharges droplets onto powder in a fabrication chamber according to the first embodiment of the present disclosure.

Next, with reference to FIG. 3, a description is given of conditions under which powder 1 may adhere to the nozzle surfaces of the discharge heads 5 due to discharge of droplets. Parts (a) and (b) of FIG. 3 are diagrams of the discharge heads 5, the carriage 6, and the fabrication stage 10 in a state in which the discharge heads 5 discharge droplets to the powder 1 in the fabrication chamber 3. Part (b) of FIG. 3 is a partially enlarged view of one of the discharge heads 5 discharging droplets so as to illustrate conditions under which powder 1 may adhere to the nozzle surfaces of the discharge heads 5 due to discharge of droplets.

Preferably, the discharge speed of the droplets has a speed equal to or higher than a certain value so that the droplets land on the powder 1 with high accuracy. This is because the actual velocity vector of the droplets is a vector in which the discharge velocity (Vj) of the droplets and the movement velocity (Vc) of the carriage 6 are related to each other. Thus, the droplets fly in an oblique direction. This causes an error in landing positions of droplets due to the speed fluctuation of the carriage 6 and the deviation of the discharge gap (Dt) between the nozzle surface of each of the discharge heads 5 and the powder 1. This is because the influence of the deviation (error) between the moving speed (Vc) of the carriage 6 and the discharge gap (Dt) on the landing positions of the droplets decreases as the discharge speed (Vj) of the droplets increases.

In addition, the higher the discharge speed (Vj) of the droplets, the shorter the time until the droplets land on the landing positions and the smaller the influence of the airflow (which is generated by the movement of the carriage 6 or the like) on the landing positions of the droplets. For the same reason, preferably the discharge gap (Dt) is also set to a certain value or less.

In addition, desirably the size (Mj) of the droplets is set to be a certain size or more to improve the productivity (production speed) of laminating the powder 1 to fabricate the fabricated object. Furthermore, the larger the size (Mj) of the droplets, the smaller the influence of the airflow (generated by the movement of the carriage 6 or the like) on the landing positions of the droplets.

Desirably, the size (particle diameter) of the powder 1 is set to a certain value or less to enhance the resolution (surface property or accuracy) of the fabricated object. Under the above-described conditions, the powder 1 is likely to adhere to the nozzle surfaces of the discharge heads 5. Accordingly, discharge failure of droplets may occur and the reliability of the discharge head 5 may be reduced.

The principle of adhesion of the powder 1 to the nozzle surfaces of the discharge heads 5 caused by discharge of droplets is as follows. That is, landing of the droplets onto the powder 1 causes a part of the kinetic energy of the discharged droplets to flick the powder 1. As a result, the powder 1 adheres to the nozzle surfaces of the discharge heads 5.

The minimum energy necessary for the powder 1 to reach the nozzle surfaces of the discharge heads 5 is a gravitational potential energy of the powder 1 between the discharge gap. Thus, when an inequality described below holds, there is a high possibility that some changes have occurred in control targets that control parameters constituting the inequality.

Therefore, observing the changes of the state of the powder 1 adhering to the nozzle surfaces of the discharge heads 5 allows to estimate factors that deteriorate (or improve) the contamination of the nozzle surfaces. Performing the correction of control, maintenance, replacement of parts or the like of a unit related to the factor minimizes the cleaning frequency. In addition, deterioration of the fabricated object can also be prevented. In addition to the discharged droplets flicking the powder 1, adhering of the powder 1 to the nozzle surfaces of the discharge heads 5 due to an airflow caused by the movement of the carriage 6 or the like is also conceivable. However, it is found that the influence of the contamination of the nozzle surface by the airflow is small.

In the present embodiment, the kinetic energy of droplets is represented by $Mj \times ((Vj^2 + Vc^2)/2)$. Further, the potential energy of the discharge receiving medium due to gravity between the discharge gap is represented by "Dt×mass of discharge receiving medium×g (gravity acceleration)". Therefore, in a configuration in which the relation of "$Mj \times ((Vj^2+Vc^2)/2) >$ Dt×mass of discharge receiving medium×g (gravity acceleration)" is satisfied, there is a possibility that some changes occur in control targets that control the parameters constituting this inequality, when there is a change in the observation result of the nozzle surface.

The principle of adhesion of the powder 1 to the nozzle surfaces of the discharge heads 5 is described again in detail. First, control targets constituting the mass Mj and the discharge speed Vj of ink droplet are described. First, the control targets constituting the mass Mj of the droplets and the discharge speed Vj includes the viscosity of the ink. The viscosity of ink is highly dependent on the temperature of ink. Generally, the higher the temperature of ink, the lower the viscosity of ink.

Specifically, ink heaters in the discharge heads 5, ink heaters in sub tanks, the environmental temperature, and the like are control targets, and changes of these temperatures affect the temperature of ink. When the temperature of ink is changed by the above-described control targets, the viscosity of ink is changed, and the mass Mj and the discharge speed Vj of ink droplet are changed. Changes in the viscosity of ink, the mass Mj of ink droplet, and the discharge speed Vj of ink droplet depend on the type of the discharge head 5 and the discharge control.

However, these changes are measured in advance at the time of designing the discharge performance of the discharge head 5 and clarified in advance. Therefore, how the control targets change is easily estimated.

In a specific case in which changes occur in the control targets, for example, the temperature of the discharge head 5 or the temperature of the sub tank is often controlled not by directly measuring the temperature of ink but by measuring the temperature of a container or the like contacting ink. In such a case, it is estimated that a decrease in the environmental temperature may considerably affect the temperature of ink and the temperature of ink may decrease to some extent. Even when the performance of the sub tank heater or the discharge head heater is changed due to deterioration with time or the like, a change of the temperature of ink can be estimated in the same manner. Although the sub-tank temperature and the like have been described as an example of control targets, measuring changes in control targets that control the temperature of ink is effective in controlling the temperature of ink even for an apparatus that does not include a sub tank.

Next, the control targets that affect the mass Mj and the discharge speed Vj of ink droplet include volatilization of ink components, changes in ink quality, ink storage period, and deterioration in discharge performance of the discharge head 5 (the number of times and time of use), and the like. Similar with the temperature of ink, changes in the above-described parameters can also be estimated.

The three-dimensional fabricating apparatus 601 according to the present embodiment includes a plurality of control targets constituting the mass Mj and the discharge speed Vj of ink droplet. For this reason, a sensor (for example, a sensor that measures the environmental temperature) or the like is provided to identify the control targets. Further, in the maintenance operation, the three-dimensional fabricating apparatus 601 according to the present embodiment changes the heater temperatures of the sub-tank heater and the discharge head heater or changes the printing amount to measure the discharge amount of droplets. Thus, the three-dimensional fabricating apparatus 601 identifies whether the control target is the sub-tank heater or the discharge head heater.

Next, control targets constituting the moving speed of the carriage 6 are described. The moving speed of the carriage 6 is generally directly measured by a sensor such as an encoder. Abnormal vibration of the carriage 6 may occur due to, for example, carriage speed fluctuation by a sensing error caused by contamination of the encoder sensor, or contamination of a drive guide shaft of the carriage 6. As a result, the moving speed of the discharge heads 5 may change.

The carriage speed fluctuation due to the sensing error caused by contamination of the encoder sensor can be easily determined by counting the number of encoding during an operation in which the encoder sensor is returned to the home position (hereinafter, referred to as homing operation). For this reason, in a case in which contamination of the encoder sensor is concerned from contamination of the nozzle surfaces of the discharge heads 5, the three-dimensional fabricating apparatus 601 according to the present embodiment counts the number of encoding during the homing operation of the carriage 6 to detect the carriage speed fluctuation due to the sensing error caused by the contamination of the encoder sensor.

In addition, the three-dimensional fabricating apparatus 601 according to the present embodiment directly senses the abnormal vibration of the carriage 6 caused by contamination of a driving guide shaft of the carriage 6 or the like by an acceleration sensor or the like, or performs printing of a specific pattern and detects the abnormal vibration of the carriage 6 from the printing result.

Next, control targets constituting discharge gaps are described. The control targets constituting the discharge gaps include, for example, an attachment deviation of the discharge heads 5, a height deviation of a recording medium (powder surface). The discharge heads 5 are designed so as to fall within an allowable deviation when the attachment of the discharge heads 5 is normal. Therefore, a possible cause of occurrence of the above-described head attachment deviation may be an attachment failure of the discharge heads 5. Further, the discharge heads 5 are replaceable components. Thus, the head attachment deviation may be caused by an attachment failure of the discharge heads 5 when a user or a service person replaces the discharge heads 5.

The three-dimensional fabricating apparatus 601 according to the present embodiment monitors the timing of replacement of the discharge heads 5 and the timing of nozzle surface contamination. Accordingly, such a configuration enhances the accuracy of estimating the attachment failure of the discharge heads 5.

On the other hand, the above-described height deviation of the recording medium (powder surface) may be caused by, for example, a defect in any of the components for conveying the recording medium, such as contamination of a roller that forms a flat surface of the recording medium or abnormal vibration of a component, or an abnormality in the physical properties of the recording medium to be conveyed. In the case of a configuration in which powder is adopted as the recording medium, a portion of the powder that is not printed is often reused (or can be reused). In such a case, an element that changes the physical properties of the powder, such as ink mist or satellite ink, also exists in the recording medium. It is conceivable that the powder surface of the powder cannot be normally formed by reusing the above-described powder. Occurrence of this defect can be estimated from the degree of contamination of the nozzle surfaces of the discharge heads 5.

In the above-described case, a change in which the nozzle surface is not contaminated often occurs. However, the degree of the change depends on the physical properties of the powder, the physical properties of the ink, or the configuration in which the powder is conveyed. Therefore, the three-dimensional fabricating apparatus 601 according to the present embodiment observes the nozzle surfaces to detect in advance a defect such as a change in physical properties of powder, although the nozzle surface itself to be observed is not defective.

The mass of the recording medium can be measured in advance and designed. Associating the mass of the recording medium with the manufacturing information such as the lot number can enhance the accuracy of estimating the possibility that the mass change of the powder may occur due to the change in the contamination of the nozzle surfaces.

Observation Operation of Nozzle Surfaces of Discharge Heads

Figure 6:
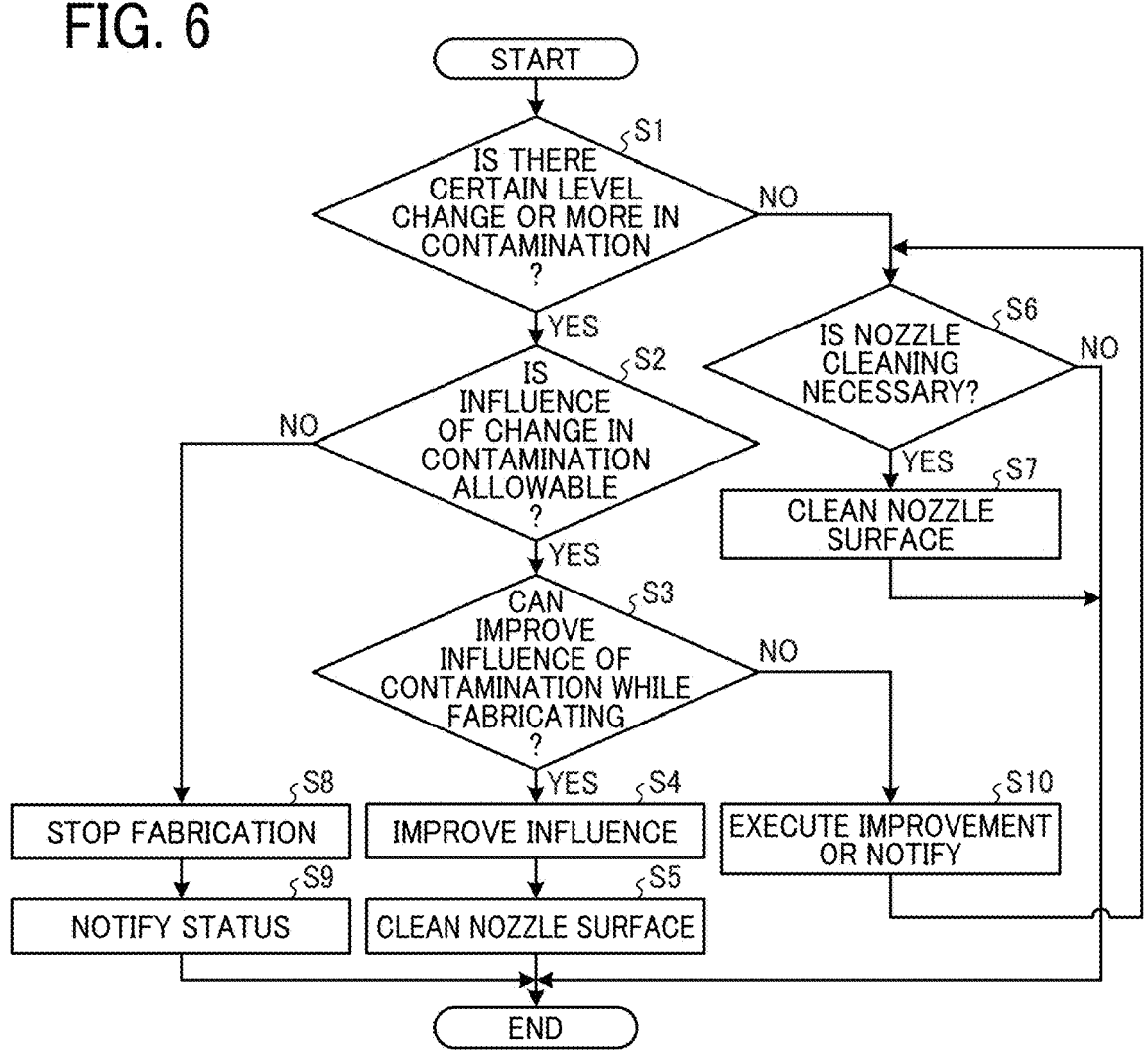
FIG. 6 is a flowchart of an observation operation of a nozzle surface of a discharge head of the three-dimensional fabricating apparatus according to the first embodiment of the present disclosure.

FIG. 6 is a flowchart of the flow of the observation operation of the nozzle surfaces. With reference to the flowchart of FIG. 6, a description is given of an operation for automatically improving the performance of units that control parameters related to adhesion of the discharge receiving medium to the nozzle surfaces based on the observation result of the discharge nozzle surfaces, or an operation for prompting a user or a service person to improve operation such as maintenance.

The flowchart of FIG. 6 starts when the observation of the nozzle surfaces is executed, and the process proceeds to step S1. The CPU 501 controls the nozzle surface condition detector 7 to observe the nozzle surfaces while moving the powder 1 for fabrication of the fabricated object. Such a configuration allows the discharge heads 5 to be in a standby state while the powder 1 is spread. Thus, the time while the powder 1 is spread can be effectively used, and the productivity can be prevented from being lowered.

When the observation of the nozzle surfaces is performed, the contamination amount analyzing unit 101 quantifies the degree of contamination of the nozzle surfaces. The contamination factor determining unit 102 (an example of a determining unit) also serving as a contamination change determining unit compares a value quantified by the contamination amount analyzing unit 101 with the contamination amount estimated from the past contamination state and the discharge history, or compares the values with previously stored data. Then, the contamination factor determining unit 102 determines whether there is a change of a certain level or more in the contamination of the nozzle surfaces (step S1). Alternatively, the contamination factor determining unit 102 determines whether there is a difference with respect to the comparison target.

When there is no change equal to or greater than a certain value in the contamination of the nozzle surfaces or there is no difference with respect to the comparison target (NO in step S1), the process proceeds to step S6. Then, the cleaning determining unit 103 determines whether cleaning of the nozzle surface is necessary. When cleaning is not necessary (NO in step S6), the process of the flowchart of FIG. 6 is terminated without cleaning the nozzle surfaces. On the other hand, when cleaning is necessary (YES in step S6), the cleaning control unit 104 controls the nozzle cleaning mechanism to perform cleaning of the nozzle surfaces (step S7), and ends the process of the flowchart of FIG. 6.

On the other hand, in a case in which the change in the contamination of the nozzle surfaces is equal to or greater than the certain value or there is a difference with respect to the comparison target (YES in step S1), the contamination factor determining unit 102 estimates the cause of the contamination of the nozzle surfaces and determines whether the influence of the estimated cause of the contamination on the fabricated object is allowable (step S2).

Specifically, an "unacceptable case" is, for example, a case in which the nozzle surfaces of the discharge heads 5 being observed are significantly contaminated with the recording medium (powder) compared to the normal case. In this case, there is a possibility that the discharge heads 5 have contacted the recording medium, and there is high possibility that a large error occurs in the shape of the fabricated object. Accordingly, the cause of the error is presumed to be in a conveyance member of the recording medium.

In addition, when the nozzle surfaces of the discharge heads 5 being observed are significantly contaminated with ink, the meniscuses on the liquid surface of the discharge heads 5 may be damaged, or the pressure balance (normally, negative pressure) in the discharge heads 5 may be broken and ink unintended to be discharged (other than the discharge operation) may leak and drip from nozzles. In this case also, there is high possibility that a large error occurs in the shape of the fabricated object. Accordingly, the error is presumed to be caused by a pressure controller or the cleaning mechanism of the discharge heads 5.

Further, when the adhesion of the recording medium (powder) to the nozzle surfaces of the discharge heads 5 being observed is significantly less than that of the normal state and the ink is normally adhered, there is high possibility that the recording medium is not normally conveyed and there is high possibility that a large error occurs in the shape of the fabricated object. Accordingly, the cause of the error is presumed to be in a conveyance member of the recording medium.

When neither ink nor recording medium (powder) adheres to the nozzle surfaces of the discharge heads 5 being observed, there is high possibility that ink is not discharged normally. In this case also, there is high possibility that a large error occurs in the shape of the fabricated object.

The extent to which such a significant change can be tolerated varies depending on the recording medium or the discharge amount of ink. Therefore, preferably, the three-dimensional fabricating apparatus 601 is designed appropriately in accordance with the system. In such a case, stopping the fabrication can quickly recover the fabrication failure and the waste of the fabrication material can be minimized.

Next, when the influence on the fabricated object is not allowable (NO in step S2), the fabrication control unit 105 (an example of a control unit) controls the fabricating unit to stop the fabrication as a fabrication error (step S8). In this case, the notification control unit 106 controls so as to display an error message indicating that fabrication is forced to stop on the operation panel 522, for example (step S9). The notification by such an error message or the like may be performed by voice, vibration, or the like.

As described above, when the influence on the fabricated object is not allowable, stopping the fabrication can save the fabrication material and the fabrication time.

Next, when it is determined that the influence on the fabricated object is allowable (YES in step S2), the process proceeds to step S3, and the contamination factor determining unit 102 determines whether the influence on the fabricated object can be improved during the fabrication. When it is determined that the influence on the fabricated object cannot be improved during the fabrication (NO in step S3), the fabrication control unit 105 controls the control target so that the influence can be improved, or the notification control unit 106 displays a countermeasure for improvement to decrease the influence on the operation panel 522 (step S10).

Note that such notification of the countermeasure for improvement may be performed by voice or the like. After such a countermeasure for improvement is executed or notified, the cleaning determining unit 103 determines whether cleaning of the nozzles is necessary in step S6. If necessary, cleaning of the nozzles is performed under the control of the cleaning control unit 104 in step S7. The cleaning control unit 104 controls a cleaning mechanism to clean the nozzle surfaces while moving the powder 1 for forming the fabricated object. Accordingly, the nozzle surfaces can be cleaned effectively using the standby time of the discharge heads 5, and the productivity of the three-dimensional fabricating apparatus 601 can be enhanced.

On the other hand, when it is determined that the influence on the fabricated object can be improved during the fabrication (YES in step S3), the fabrication control unit 105 controls the control target to improve the influence while fabricating the fabricated object (step S4). Then, the cleaning control unit 104 performs cleaning of the nozzle surfaces (step S5), and ends the process illustrated in the flowchart of FIG. 6.

Note that when it is determined that improvement cannot be made during fabrication, a countermeasure for improvement may be executed after the end of fabrication, or a notification for prompting a countermeasure for improvement may be made to a user, a service representative, or the like.

In the present embodiment, whether the influence can be improved by the fabrication control unit 105 depends on whether the control target has an automatic improvement mechanism. Therefore, the fabrication control unit 105 may be appropriately designed according to the purpose and specification of the three-dimensional fabricating apparatus 601. For example, a conveyance unit of the recording medium includes a conveyance unit cleaning mechanism of the recording medium. In such a case, when some failure is assumed in the conveyance unit of the recording medium, the fabrication control unit 105 performs cleaning of the conveyance unit to improve the failure. When the influence is not improved even if the cleaning of the conveyance unit is performed, the notification control unit 106 performs a notification indicating a sign of a malfunction of the conveyance unit after the end of the fabrication. Accordingly, the user or the service person can be prompted to perform repair such as inspection or component replacement.

In addition, a change may be observed even when the adhesion of the ink and the recording medium (powder) to the nozzle surfaces of the discharge heads 5 being observed is within an allowable range. One of the reasons for this is that ink mist or powder adheres to the encoder that monitors the speed of the carriage 6, causing the encoder to skip monitoring. When the monitoring skipping of the encoder occurs, the sensing interval becomes wide in accordance with the skipped section. The encoder attempts to control the skipped wide section at a constant speed, so that the speed of the carriage 6 increases or the carriage 6 exhibits a vibrating operation. Due to the influence as described above, the discharge speed of the ink droplets also changes, and the adhesion amount of ink and the recording medium (powder) on the nozzle surfaces of the discharge heads 5 being observed changes. The ink and the recording medium (powder) are examples of the "attached matter". The encoder of the carriage 6 is usually not provided with a cleaning mechanism. Thus, replacement of parts is a countermeasure when monitoring skipping of the encoder occurs. For this reason, the notification control unit 106 performs a notification indicating a sign of malfunction in the conveyance unit after the end of fabrication. Accordingly, the user or the service person can be prompted to perform repair such as inspection or component replacement.

Effect of First Embodiment

As apparent from the above description, the three-dimensional fabricating apparatus 601 according to the first embodiment calculates the amount of attached matter (ink, powder, and the like) adhering to the nozzle surfaces based on the observation result of the nozzle surfaces of the discharge heads 5. Then, based on the calculation result of the adhesion amount of the attached matter, an operation with respect to a control target that controls at least one of the mass of the ink (droplet) and the discharge speed of ink is determined.

As a result, factors that deteriorate (or improve) the contamination of the nozzle surfaces can be estimated, and correction of control of the related unit, maintenance, component replacement, and the like can be performed. Therefore, the frequency of cleaning of the discharge heads 5 can be restrained to be low, and the productivity of the three-dimensional fabricating apparatus 601 can be enhanced. Further, the durability of the water repellent film of the discharge nozzle can be enhanced.

In addition, the decrease of the productivity of the three-dimensional fabricating apparatus 601 and the impairment of the durability of the water repellent film of the nozzle surfaces caused by the increase of the frequency of cleaning the nozzle surfaces of the discharge head 5 can be prevented. In addition, the frequency of cleaning the nozzle surfaces of the discharge heads 5 can be reduced, and deterioration of the fabricated object can be prevented.

Second Embodiment

Next, a three-dimensional fabricating apparatus 601 according to a second embodiment of the present disclosure is described. The adhesion amount of ink and the adhesion of powder amount estimated to be adhered to the nozzle surfaces of the discharge heads 5 are different from each other. For this reason, in the three-dimensional fabricating apparatus 601 according to the second embodiment, the contamination amount analyzing unit 101 separately estimates the adhesion amount of ink and the adhesion amount of powder with respect to the discharge heads 5 based on the image of the nozzle surfaces of the discharge heads 5 captured by the nozzle surface condition detector 7. Such a configuration allows to perform cleaning of the discharge heads 5 more efficiently and at more optimal timing.

The three-dimensional fabricating apparatus 601 according to the second embodiment has the same configuration and effects as those of the three-dimensional fabricating apparatus 601 according to the first embodiment described above except that the amount of adhered ink and the amount of adhered powder are separately estimated. Therefore, the differences between the three-dimensional fabricating apparatus 601 according to the second embodiment and the three-dimensional fabricating apparatus 601 according to the first embodiment are mainly described below, and redundant descriptions are omitted below.

Hardware Configuration According to Second Embodiment

The three-dimensional fabricating apparatus 601 according to the second embodiment includes a light source driver 520 and a light source 8 indicated by blocks of dotted lines in FIG. 4 in addition to the units described with reference to FIG. 4. The light source 8 includes an ink detection light source 8a for ink detection and a powder detection light source 8b for powder detection.

The ink detection light source 8a and the powder detection light source 8b have different wavelengths. For example, ultraviolet light, visible light, infrared light, or the like can be used. The ink detection light source 8a and the powder detection light source 8b irradiate the nozzle surfaces of the discharge heads 5 with the detection light for ink or the detection light for powder respectively, downward in the vertical direction. Alternatively, the ink detection light source 8a and the powder detection light source 8b irradiate the nozzle surfaces of the discharge heads 5 with the ink detection light and the powder detection light, respectively, from an oblique direction at a predetermined angle.

The ink and the powder adhering to the nozzle surfaces of the discharge heads 5 may or may not show edge contrast as an image due to the irradiation lights. The three-dimensional fabricating apparatus 601 according to the second embodiment selects a wavelength at which the edge contrast is most emphasized as an image for each of ink and the powder. Thus, the three-dimensional fabricating apparatus 601 distinguishes (separates) and recognizes ink and the powder based on the image.

Functional Configuration According to Second Embodiment

In the three-dimensional fabricating apparatus 601 according to the second embodiment, the CPU 501 illustrated in FIG. 4 executes a fabricating program stored in a storage device such as a ROM 502 and includes a light source drive control unit 107 indicated by a block of a dotted line in FIG. 5, in addition to the functions described with reference to FIG. 5. The light source drive control unit 107 controls the light emission of the ink detection light source 8a and the powder detection light source 8b via the light source driver 520 illustrated in FIG. 4.

Figure 7:
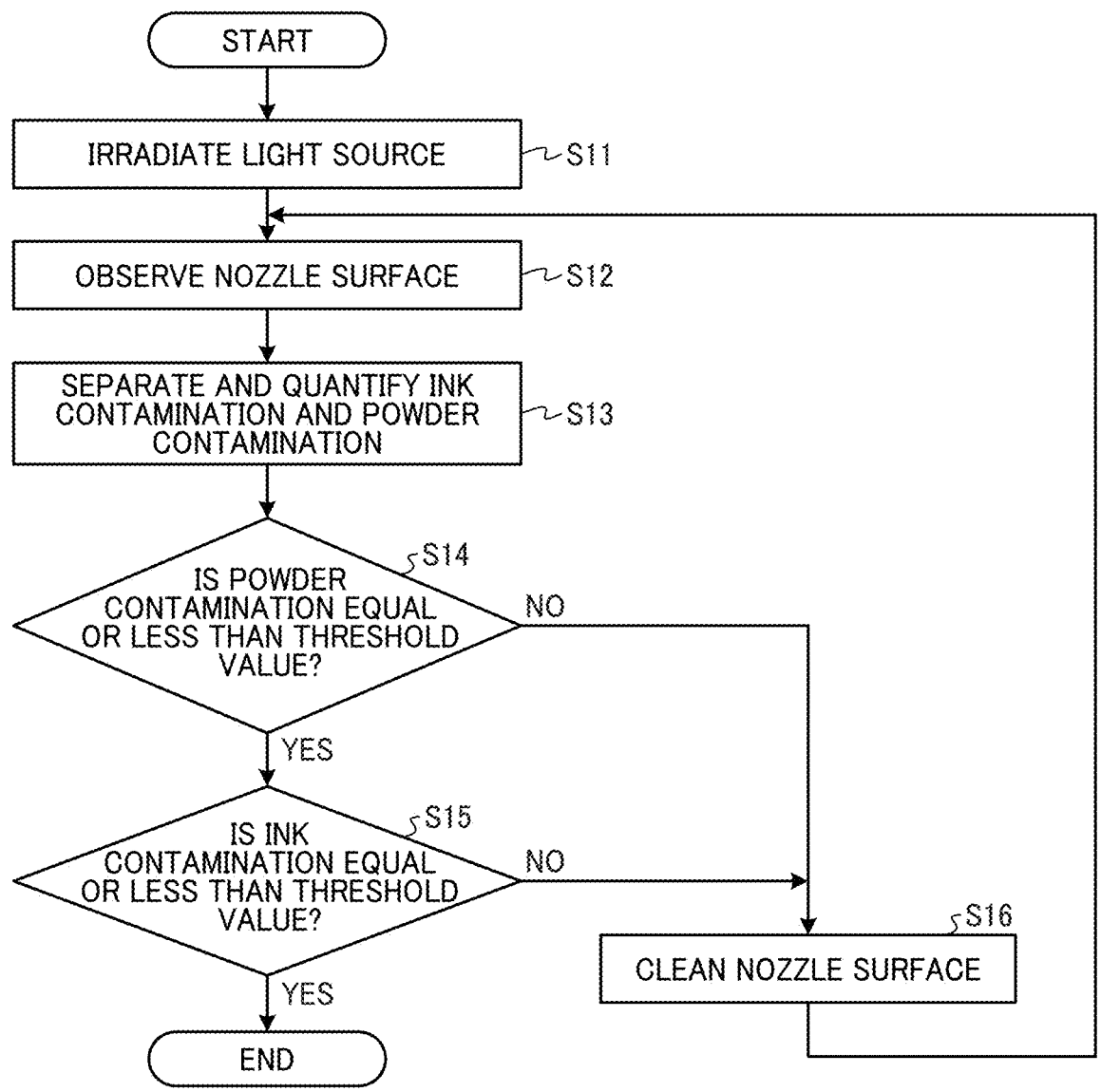
FIG. 7 is a flowchart of a flow of an observation operation of a nozzle surface of a discharge head of a three-dimensional imaging apparatus according to a second embodiment of the present disclosure.

Observation Operation of Nozzle Surfaces of Discharge Heads According to Second Embodiment FIG. 7 is a flowchart of the observation operation flow of the nozzle surfaces according to the second embodiment of the present disclosure. The flowchart of FIG. 7 starts when the observation of the nozzle surfaces is started, and the process proceeds to step S11. In step S11, the light source drive control unit 107 illustrated in FIG. 5 simultaneously performs lighting control (or blinking control) of the ink detection light source 8a and the powder detection light source 8b via the light source driver 520. The ink detection light source 8a and the powder detection light source 8b may be controlled to be turned on (or turned on and off) at a predetermined time difference.

Figure 8:
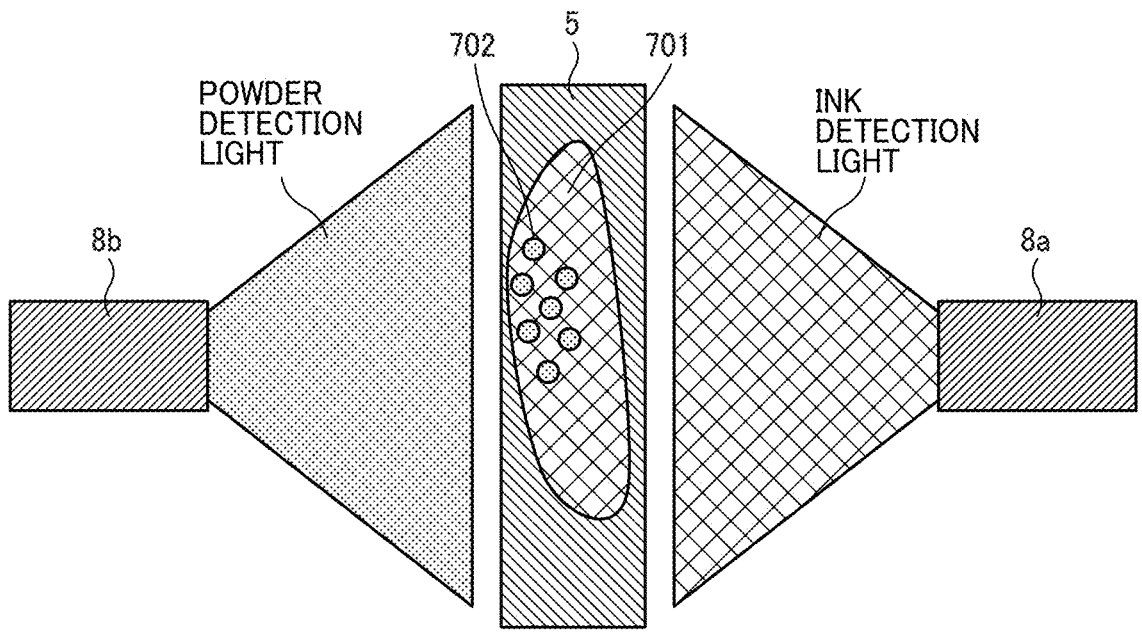
FIG. 8 is a schematic view of a nozzle surface of a discharge head irradiated with ink detection light from an ink detection light source and powder detection light from a powder detection light source, according to an embodiment of the present disclosure.

FIG. 8 is a schematic view of the nozzle surface of the discharge head 5 irradiated with the detection light for ink from the ink detection light source 8a and the detection light for powder from the powder detection light source 8b. The ink detection light has a wavelength that enhances the contrast of the edge of the ink 701 adhering to a nozzle surface in an image capturing the nozzle surface. Further, the powder detection light has a wavelength that enhances the contrast of the edge of powder 702 adhering to the nozzle surface in the image capturing the nozzle surface. Therefore, as illustrated in FIG. 8, the ink 701 and the powder 702 can be clearly distinguished and recognized based on the image capturing the nozzle surface.

That is, the nozzle surface condition detector 7 captures an image of the nozzle surface irradiated with the ink detection light and the powder detection light (step S12). The contamination amount analyzing unit 101 clearly distinguishes (separates) and recognizes the ink and the powder adhering to the nozzle surfaces based on the image of the nozzle surface captured by the nozzle surface condition detector 7. Then, the contamination amount analyzing unit 101 separates the ink 701 and the powder 702 adhering to the nozzle surfaces and quantifies the ink 701 and the powder 702 separately (step S13).

Next, the contamination factor determining unit 102 compares the value of the powder 702 quantified by the contamination amount analyzing unit 101 with the contamination amount of the powder 702 estimated from the past contamination level by the powder and the discharge history, or compares the values with previously stored data, and determines whether there is a change of a certain amount or more (change of a threshold value or more) in the contamination of the nozzle surfaces by the powder (step S14).

When it is determined that the contamination of the nozzle surface by the powder has changed by the certain amount or more (NO in step S14), the cleaning control unit 104 controls the nozzle cleaning mechanism to clean the nozzle surfaces (step S16). Thereafter, the process returns to step S12.

On the other hand, when it is determined that the contamination of the nozzle surfaces by the powder has not changed by the certain amount or more (YES in step S14), the contamination factor determining unit 102 compares the value of the ink 701 quantified by the contamination amount analyzing unit 101 with the contamination amount of the ink 701 estimated from the contamination level and discharge history of the ink 701 in the past or compare the values with previously stored data to determine whether the contamination of the nozzle surfaces by the ink 701 has changed by the certain amount or more (change by the threshold value or more) (step S15).

When it is determined that the contamination of the nozzle surfaces with the ink 701 has changed by the certain amount or more (NO in step S15), the cleaning control unit 104 controls the nozzle cleaning mechanism to clean the nozzle surfaces (step S16). Thereafter, the process returns to step S12.

When it is determined that there is no change by the certain amount or more in the contamination of the nozzle surfaces by ink 701 (YES in step S15), it means that the amount of adhesion of the contamination by the powder 702 and the ink 701 to the nozzle surfaces is less than a predetermined level. Thus, the process of the flowchart of FIG. 7 ends.

Effect of the Second Embodiment

As apparent from the above description, the three-dimensional fabricating apparatus 601 according to the second embodiment recognizes the contamination of the nozzle surfaces by the ink 701 and the powder 702 separately to determine whether the cleaning is necessary. Such a configuration allows to perform cleaning on the discharge heads 5 more efficiently and at more optimal timing, and also to obtain the same effects as those of the first embodiment described above.

Variation

The second embodiment described above is an example in which the ink detection light source 8a and the powder detection light source 8b that irradiate the detection light for ink or the detection light for powder are used as the light source 8. However, the light source 8 that irradiates the nozzle surfaces of the discharge heads 5 with predetermined pattern light such as a stripe pattern may be used.

Figure 9:
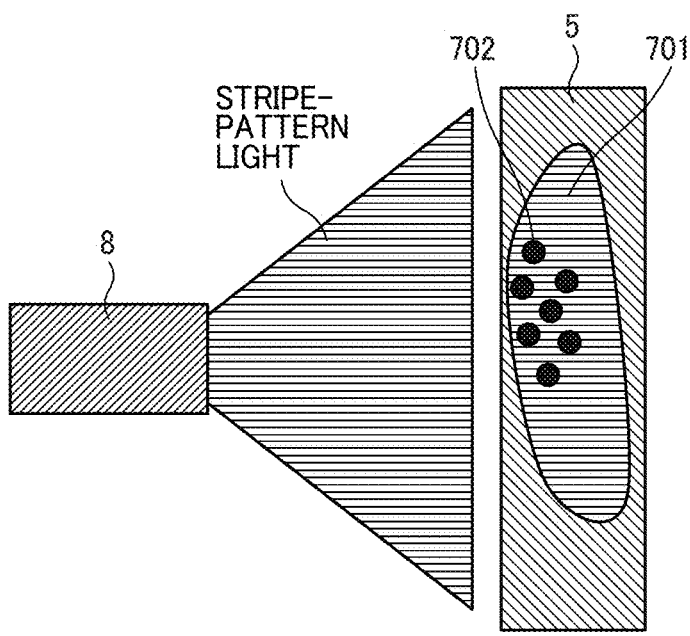
FIG. 9 is a schematic view of a nozzle surface of a discharge head irradiated with stripe-pattern light from a light source in a three-dimensional imaging apparatus according to a variation of the present disclosure.

FIG. 9 is a diagram illustrating the nozzle surface of the discharge head 5 in a state in which the light source 8 irradiates the nozzle surface of the discharge head 5 with stripe-pattern light. As the stripe-pattern light irradiated from the light source 8, ultraviolet light, visible light, infrared light, or the like can be used. Further, the stripe-pattern light may be irradiated vertically downward with respect to the nozzle surfaces of the discharge heads 5, or may be irradiated from an oblique direction at a predetermined angle.

In this case, as illustrated in FIG. 9, the unevenness of the ink 701 and the powder 702 adhering to the nozzle surface of the discharge head 5 is emphasized by the stripe-pattern light. The image of ink 701 and the powder 702 in the state in which unevenness is emphasized are captured by the nozzle surface condition detector 7. The contamination amount analyzing unit 101 and the contamination factor determining unit 102 can separately recognize the ink 701 and the powder 702 based on the image captured by the nozzle surface condition detector 7. Thus, cleaning on the discharge heads 5 can be performed more efficiently and at more optimal timing in the same manner as described above.

The above-described embodiments are presented as examples and are not intended to limit the scope of the present disclosure. The above-described embodiments can be implemented in other various forms, and various omissions, replacements, and changes can be made without departing from the scope of the present disclosure. In addition, the embodiments and modifications or variations thereof are included in the scope and the gist of the disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A droplet discharge apparatus comprising:
 a powder supply device configured to supply powder;
 a discharge head including a nozzle configured to discharge a droplet onto a discharge receiving medium formed of the powder supplied by the powder supply device, wherein the discharging the droplet causes a splash amount of the powder and/or matter of the droplet to become attached to the nozzle surface as attached matter;
 a nozzle surface observation device configured to observe a nozzle surface of the nozzle of the discharge head; and
 processing circuitry configured to:
  control the powder supply device to supply the powder,
  control the discharge head to discharge the droplet,
  calculate an adhesion amount of the attached matter on the nozzle surface based on an observation result of the nozzle surface observation device,
  determine, based on a calculation result of the adhesion amount of the attached matter, an operation on a control target that controls at least one of a mass and a discharge speed of the droplet, and control the discharge head to discharge an updated droplet based on the operation, the updated droplet having at least one of a modified mass and a modified discharge speed compared to the droplet.

2. The droplet discharge apparatus according to claim 1, further comprising a cleaning mechanism configured to clean the nozzle surface, wherein the processing circuitry is configured to:

control the cleaning mechanism;

quantify an adhesion amount of the attached matter to the discharge receiving medium based on the observation result of the nozzle surface observation device; and determine whether to clean the nozzle surface based on a value of the adhesion amount quantified by the processing circuitry.

3. The droplet discharge apparatus according to claim 2, wherein the processing circuitry is configured to:

determine presence or absence of a change in contamination of the nozzle surface based on the value of the adhesion amount quantified by the processing circuitry; and determine whether to clean the nozzle surface based on a determination result of the presence or absence of a change in contamination of the nozzle surface.

4. The droplet discharge apparatus according to claim 3, wherein the processing circuitry is configured to:

estimate a cause of contamination based on the determination result of the presence or absence of a change in contamination of the nozzle surface.

5. The droplet discharge apparatus according to claim 4, wherein the processing circuitry is configured to control the control target to improve a factor that can be improved during fabrication of the discharge receiving medium when the factor of the cause of the contamination estimated by the processing circuitry is the factor that can be improved during fabrication of the discharge receiving medium.

6. The droplet discharge apparatus according to claim 2, wherein the processing circuitry is configured to control the cleaning mechanism to perform cleaning of the nozzle surface during movement of the powder for fabrication of the discharge receiving medium.

7. The droplet discharge apparatus according to claim 1, wherein the nozzle surface observation device is configured to observe the nozzle surface during movement of the powder for fabrication of the discharge receiving medium.

8. A droplet discharge method comprising:

supplying powder form a powder supply device;

discharging a droplet through a nozzle onto a discharge receiving medium formed of the powder supplied by the powder supply device, the discharging being from a discharge head, wherein the discharging the droplet causes a splash amount of the powder and/or matter of the droplet to become attached to the nozzle as attached matter; observing a nozzle surface of the nozzle of the discharge head by a nozzle surface observation device;

calculating an adhesion amount of the attached matter on the nozzle surface based on an observation result of the nozzle surface observation device by a processing circuitry;

determining an operation on a control target that controls at least one of a mass and a discharge speed of the droplet, based on a calculation result of the adhesion amount by the calculating by the processing circuitry; and discharging an updated droplet based on the operation, the updated droplet having at least one of a modified mass and a modified discharge speed compared to the droplet.

9. A non-transitory, computer-readable storage medium storing computer-readable program code that causes a computer to perform fabrication, the fabrication comprising:

supplying powder form a powder supply device;

discharging a droplet through a discharge head onto a discharge receiving medium formed of the powder supplied by the powder supply device, the discharging being from a discharge head, wherein the discharging the droplet causes a splash amount of the powder and/or matter of the droplet to become attached to the discharge head as attached matter;

observing a nozzle surface of a nozzle of a discharge head;

calculating an adhesion amount of the attached matter to the nozzle surface based on an observation result of the nozzle surface by the observing;

determining an operation on a control target that controls at least one of a mass and a discharge speed of the droplet based on a calculation result of the adhesion amount by the calculating; and discharging an updated droplet based on the operation, the updated droplet having at least one of a modified mass and a modified discharge speed compared to the droplet.

10. The droplet discharge apparatus according to claim 1, wherein the nozzle surface observation device is configured to observe the nozzle surface of the nozzle of the discharge head during movement of the powder for fabrication of the discharge receiving medium.

11. The droplet discharge apparatus according to claim 1, wherein the attached matter includes at least the powder.

12. The droplet discharge apparatus according to claim 4, wherein the processing circuitry is configured to control the discharge head to stop an operation of discharging the droplet to the discharge receiving medium when a factor of the cause of contamination estimated by the processing circuitry is unacceptable for a quality of the discharge receiving medium.

13. The droplet discharge apparatus according to claim 1, wherein the nozzle surface observation device is configured to separately determine an amount of powder and an amount of matter of the droplet in the attached matter.

* * * * *